J. N. WOOD.
BALING DEVICE.
APPLICATION FILED APR. 23, 1909.
971,947.
Patented Oct. 4, 1910.
2 SHEETS—SHEET 2.
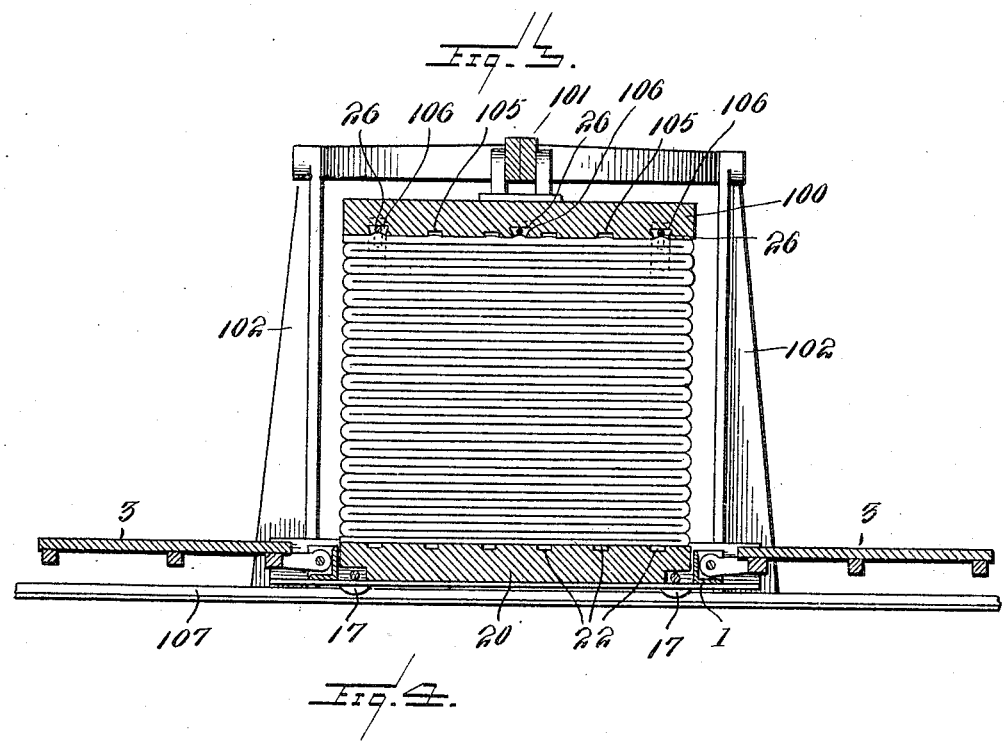
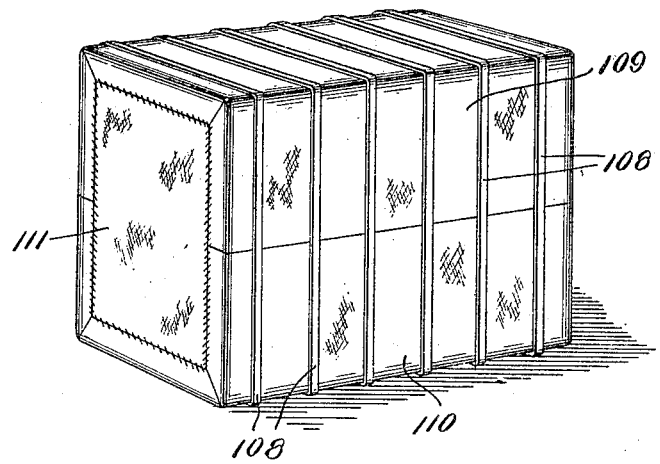

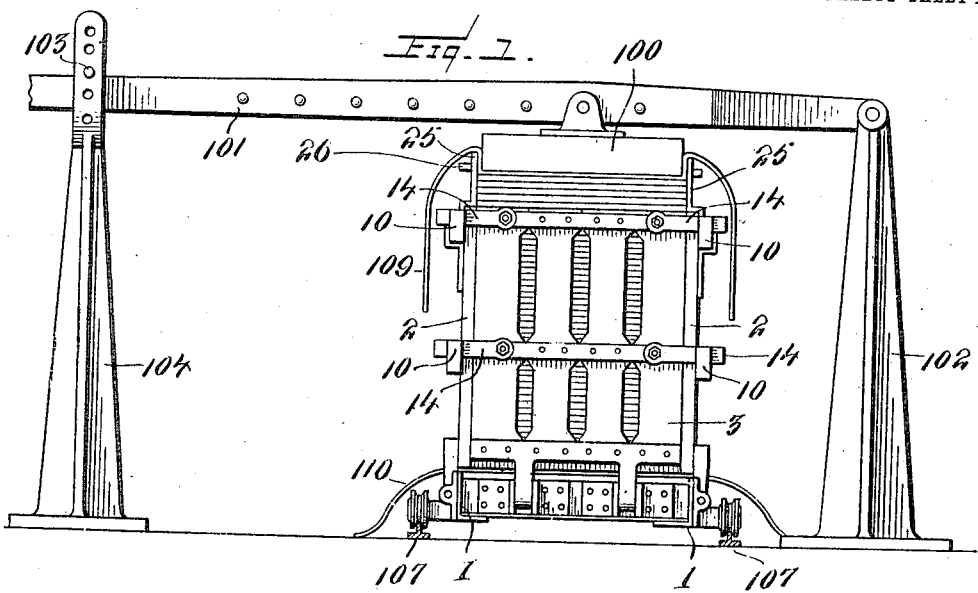
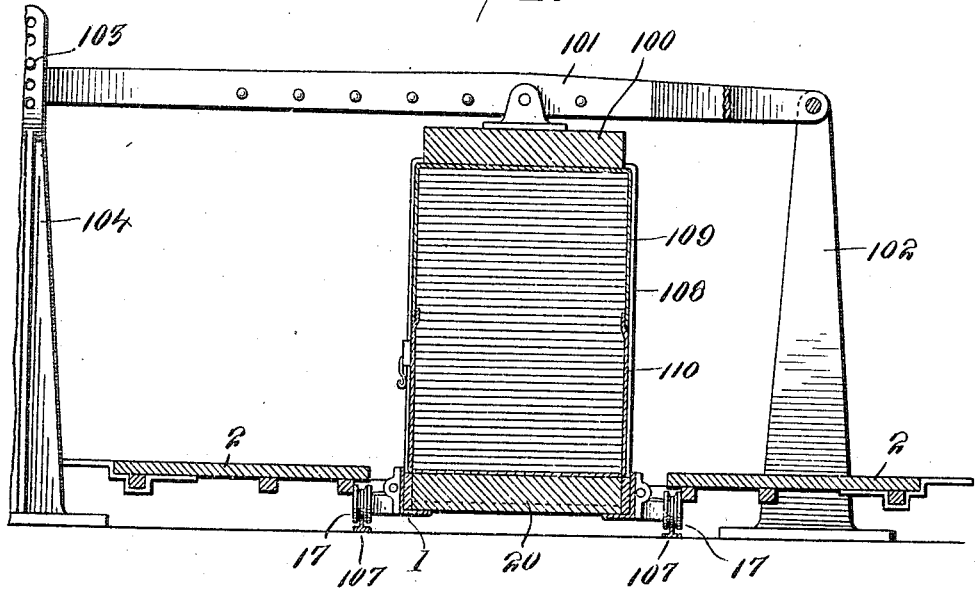

UNITED STATES PATENT OFFICE.

JAMES N. WOOD, OF RICHMOND, VIRGINIA, ASSIGNOR TO THE NEELY COMPRESS AND COTTON CO., INC., OF RICHMOND, VIRGINIA.

BALING DEVICE.

971,947. Specification of Letters Patent. Patented Oct. 4, 1910.

Application filed April 23, 1909. Serial No. 491,854.

*To all whom it may concern:*

Be it known that I, JAMES N. WOOD, citizen of the United States, residing at Richmond, in the county of Henrico and State of Virginia, have invented certain new and useful Improvements in Baling Devices; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying my invention and said invention is fully disclosed in the following description and claims.

Referring to the drawings, Figure 1 represents a side elevation of my improved apparatus showing it in use in confining a bale in a bale box prior to the removal of the retaining devices or bars. Fig. 2 represents a vertical sectional view taken through the bale box and bale near the center of the same, a part of the lever being broken away. Fig. 3 is a vertical sectional view taken in a plane at right angles to the plane of section of Fig. 2. Fig. 4 is a perspective view of the completed bale after it is wrapped and tied.

My present invention relates to apparatus for us in connection with the type of baling presses in which the bale is formed in a knock down bale box and secured therein by retaining bars extending across the top of the box, the bale box and bale being then removed from the press to a convenient point on the baling floor where the bale is removed from the box, wrapped and tied, and my invention consists in apparatus for facilitating the removal of the retaining bars the removal of the bale from the box and the wrapping and tying of the bale.

In the drawings I have shown a bale box comprising a retangular bottom frame 1, side walls 2, 2 and end walls 3, 3, the side and end walls being hinged to the bottom frame so that the four walls can be thrown down into horizontal position. The end walls and side walls are held together when the box is closed by suitable securing devices, such as the hooks 14 on the end walls, which engage the locking studs 10 projecting from the lateral edges of the side walls, and the box may be knocked down by simply raising the hooks 14. The box is provided with a bottom 20 movable vertically within the side and end walls and normally resting upon the bottom frame 1 when the box is empty or when a full bale is compressed therein, the upper face of the bottom being provided with a series of transverse grooves 22, to facilitate the insertion of the bale bands. The side walls 2, 2 are provided at their upper edges with perforated ears 25, 25, which receive transverse retaining bars 26, 26, 26 to hold the bale after it is fully compressed by the baling mechanism. This box is especially adapted for use with a baling press of the type shown in my former application, Serial No. 487,229 filed April 1, 1909 but its use is not confined to the press there shown and said box is specifically covered by my application Serial No. 479,380 filed Feb. 23, 1909.

Referring to the accompanying drawings the apparatus embodying my present invention comprises a block 100 which is carried by a lever 101, pivoted at one end in a standard or standards 102, and means are provided for securing the free end of the lever after the block has been brought into proper engagement with the top of the bale in said bale box, which means consists as here shown, of a standard 104, provided with a series of apertures, and a pin 103 to engage one of said apertures and hold the free end of the lever 101 in its adjusted position.

The block 100 is provided with a series of transverse recesses 105, corresponding in number and position with the bale band recesses 22 in the bottom of the bale box, and a number of deeper recesses 106, corresponding in number and location with the retaining bars 26. The recesses 106 may or may not coincide with the recesses 105 as preferred or found convenient. In this instance the central recess 106 is separate from and the outer recesses 106 coincide with the ordinary bale band recesses.

I prefer to provide a track 107 on which the rollers 17 of the bale box are run, to assist in positioning the box with respect to the block 100. The box is run on the track 107 with the bale retained therein and the block 100 is brought down upon the top of the bale with the recesses 106 over the retaining bars, and pressed down upon the same firmly and then secured by the pin 103 (or equivalent means). The block 100 will press the top layer of cotton down upon the bale, on opposite sides of the bars, and the bars will be pressed upward by the cotton into the recesses 106, thus freeing them from pressure, so that they can be readily withdrawn endwise by hand. The sides and ends of the bale box are then dropped into horizontal position as indicated in Figs. 2 and 3. The bale bands 108 are then passed through the bale band recesses in the bottom 20 and top block 100, and the bale is secured thereby. If the bale is to be covered, a piece of burlap 109 or other material is laid over the top of the bale before the block 100 is placed in position as indicated in Fig. 1, the ends of which being free, permit the ready removal of the bars 26, after which the top piece of burlap and the bottom piece 110 which is placed on the box bottom 20 before the bale is formed, are drawn tightly around the bale, the ends being overlapped, and secured by the bale bands. The ends of the bale are then protected by additional pieces 111 of material placed over them and secured in position by sewing with cord or otherwise, thus making a very neat bale and protecting the contents thereof. As soon as the bale is tied by the application of the bale bands 108, it can be removed from the box, by releasing the pin 103 and the box is closed and secured ready for insertion into the press to receive another bale.

What I claim and desire to secure by Letters Patent is:—

1. Apparatus for facilitating the removal of bales from knock down bale boxes, comprising among its members, a support for the bale box, a top block for engaging the top of the bale, provided with recesses for the insertion of bale ties, means for forcing said top block down upon the top of the bale, to relieve the same from the bale retaining means with which the bale box is provided, and permit the box to be opened.

2. Apparatus for facilitating the removal of bales from knock down bale boxes, comprising among its members, a support for the bale box, a top block for engaging the top of the bale, provided with recesses for the insertion of bale ties, and with recesses to accommodate the bale retaining devices with which the bale box is provided, and means for forcing the top block down upon the top of the bale to relieve it from the bale retaining devices, and hold it under compression while the box is opened and the bale ties are applied.

3. The combination with a knock down bale box provided with bale retaining devices extending over the top of the bale, of apparatus for facilitating the removal of the bale, including means for supporting and positioning the bale box, a top block provided with recesses in its lower face to accommodate the said retaining devices and with bale tie recesses, mechanism for forcing said top block down upon the top of the bale, and means for holding said top block in operative position to permit the box to be opened and the bands applied without relieving the bale from its compression.

4. The combination with a knock down bale box provided with bale retaining devices extending across the top of the box, and having supporting wheels or rollers, of means for facilitating the removal of the bale comprising a supporting track for engaging said wheels or rollers, a top block supported in predetermined relation to said wheels or rollers, so as to engage the top of the bale, said block being provided with bale tie recesses, and with recesses to accommodate and permit the removal of said retaining devices, means for forcing said block down upon the bale, and locking means for holding the block in operative position.

In testimony whereof I affix my signature, in the presence of two witnesses.

JAMES N. WOOD.

Witnesses:
Wm. P. De Saussem,
Chas. E. Dunn.